United States Patent Office 3,455,636
Patented July 15, 1969

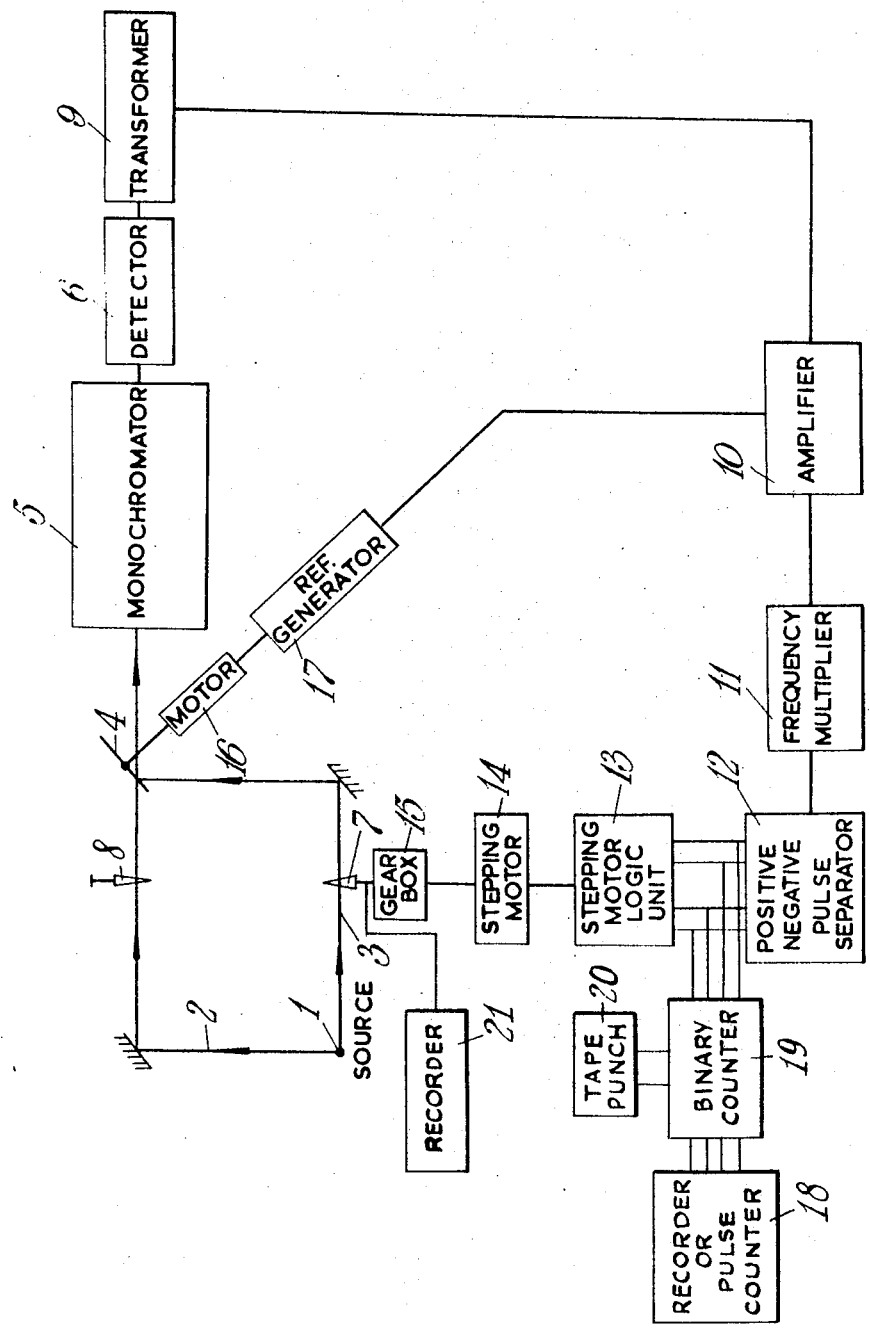

3,455,636
RADIATION COMPARISON SYSTEM FOR
DOUBLE BEAM SPECTROMETERS
Ronald Haswell, Newcastle-upon-Tyne, England, assignor to Sir Howard Grubb Parsons Limited, Walkergate, Newcastle-upon-Tyne, England, a British company
Filed Oct. 4, 1965, Ser. No. 492,542
Claims priority, application Great Britain, Oct. 8, 1964, 41,159/64
Int. Cl. G01j 3/42
U.S. Cl. 356—89                                     8 Claims

ABSTRACT OF THE DISCLOSURE

A null balance double beam spectrometer including means for forming two beam paths of radiation, means for interrupting the two beam paths at the same frequency but opposite in phase, detection means arranged to receive radiation from each beam path in turn and to produce electrical pulses of at least the frequency of interruption, and means operable by said pulses to produce spectra of sample substances under test in said spectrometer.

---

This invention relates to double beam spectrometers of the kind in which radiation from a suitable source or sources is directed via two beam paths, one path containing a sample and the other being a reference path, to a mono-chromator from which selected wavelengths from each path are directed successively on to radiation detection means for producing an electric signal related to the energy difference between the two paths over the selected narrow band of wavelengths.

The electric signals are commonly used to operate a chart recorder on which a pen traces the variation in energy with wavelength or wave number.

It is often desirable to be able to record the spectra in different forms and the object of the present invention is to increase the flexibility of such instruments so as to enable the spectra to be recorded in one or more different ways.

The present invention consists in a method of determining, in a spectrometer, the ratio of energy, or a function related thereto, received from two beam paths of radiation, which method comprises interrupting the two beam paths at the same frequency but in opposite phase, producing electrical pulses of constant amplitude the polarity of the pulses being dependent on the relative intensity of the radiation in the two beam paths and determining said ratio as function of the difference in the number of positive and negative pulses.

The invention further consists in appaartus for carrying out the method of the preceding paragraph, comprising a spectrometer having two beam paths of radiation and means for interrupting the two beam paths at the same frequency but opposite in phase, detection means, receiving radiation from each beam path in turn and producing said electrical pulses at at least the frequency of interruption, and means operable by said pulses to produce spectra of sample substances under test in said spectrometer.

In one form, the means for producing spectra includes an attenuating member movable in a beam path to equalise the energy received by the detection means from each beam path, a reversible electric motor receiving pulses from said detection means and operable to alter the position of said attenuator in the beam, the direction of movement of the attenuator depending on the polarity of the pulses received by said motor, and recording means for recording spectra.

The pulse output from the detection means may also be fed to a multi-channel binary counter the output of which counter feeds a tape punch to produce a tape which is available for analysis in a digital computer.

If desired, the pulsed output from the detection means can be fed to a pulse counter to indicate digitally the transmission or absorption of a sample substance under investigation by the spectrometer. Any of these uses of the pulsed output can be used individually or collectively with a spectrometer.

The invention will now be described in one form by way of example with reference to the accompanying drawing which shows in diagrammatic form a spectrometer in accordance with one form of the present invention.

In carrying the invention into effect in the form illustrated by way of example, radiation from a source 1 is directed along two separate beam paths 2 and 3 one of which, path 2, is a path containing a sample substance under investigation and the other path 3 is a reference path. Both beam paths are subsequently chopped by means of rotating chopper 4 and focussed alternately on an entrance slit of a monochromator 5 equipped with a wavelength selection device such as a prism or grating. The wavelength selection device is slowly rotated so as to traverse a spectrum across an exit slit of the monochromator. Radiation passing through the exit slit falls on detector 6 which produces an electric signal related to the energy content of the radiation.

If the energy in both beams is the same no signal is produced by the detector and a common form of instrument works on the null balance principle whereby any signal from the detector is applied to an attenuator comb 7 which moves in one of the beam paths to reduce or increase the energy transmitted to the detector from that beam path until a balance between the beam paths is restored and no signal is produced by the detector. The position of the attenuator is then an indication of the ratio of the energy content of the respective beam paths often referred to as the "transmission" of the sample.

The spectrometer also includes a trimmer 8 which permits initial adjustment of the instrument to allow for differences in the transmission of each beam path.

The spectrometer described above is typical of many forms of spectrometer although many variations in the optical components used and their positions relative to one another are possible.

The output from the detector is of approximately sinusoidal form and the phase of the signal can be arbitrarily designed positive or negative. For example, it could be deemed negative when say the energy from the reference path is greater than that from the sample path and positive when it is smaller.

In accordance with the invention the sinusoidal signal from the detector is converted into short duration pulses preferably at a multiple of the signal frequency. Such pulses then have positive or negative polarity according to whether the energy from the reference path is greater or smaller than that from the sample path. Means are then provided which are responsive to the polarity of the pulses to move attenuator comb 7 so as to balance the energy in the beam paths.

If the chopping frequency is 33⅓ cycles/sec. the pulses could be generated at a frequency of say 10 times this frequency that is 333⅓ pulses/sec.

The output from the detector 6 passes to a special voltage amplifying transformer 9 having electrostatic and electromagnetic screening and then to amplifier 10 which incorporates a synchronous rectifier the output of which is a D.C. voltage whose polarity is positive, say, for sine waves of positive phase and negative, say, for sine waves of negative phase. This D.C. voltage is then chopped by an inverter circuit in a frequency multiplier 11 at a frequency of $n$ times the original radiation chopping frequency of the chopper 4.

The output of frequency multiplier 11 is therefore a train of short duration pulses, positive going when the detector sees a sine wave of positive phase and negative going when the detector sees a sine wave of negative phase.

The leading edges of the pulses emerging from the inverter circuit must be of predetermined slope and this is a function of the parameters of the inverter.

The positive and negative going pulses are separated in unit 12 and the negative going set are inverted. There are now two channels of pulses, one arising from positive phases at the detector equivalent to a condition say when the reference beam transmission less than sample beam transmission and the other arising from negative phases at the detector equivalent to a condition say when the reference beam transmission is greater than sample beam transmission.

The two channels which can clearly never contain pulses simultaneously, are fed via a logic circuit 13 to a stepping motor 14. The stepping motor is a multi-winding motor having the property that the shaft rotates through discrete angles when pulses are applied to the windings in a definite logical pattern, the shaft rotating in discrete steps in say a clockwise direction. If the logical pattern is changed the shaft may be made to rotate in an anti-clockwise direction.

Two circuits are incorporated in the logic unit 13 to provide the logic patterns for clockwise and anti-clockwise rotation of the motor 14. Each is fed from its own channel of pulses.

The shaft of motor 14 is coupled via gearbox 15 to the attenuator comb 7.

The chopper 4 is driven by motor 16 coupled to reference generator 17 which supplies a reference signal to the synchronous rectifier in amplifier 10.

If the transmission in the sample beam at a particular wavelength reflected by the monochromator is reduced by the absorption band, a null balance position will no longer exist at the detector 6 and a sine wave of negative phase will be generated in the detector circuit. In the manner described above pulses will occur in one of the channels and the motor will step around in such a direction as to move the attenuator comb 7 into the reference beam. This will continue until attenuation by comb 7 in the reference beam is equal to the attenuation in the sample beam produced by the absorption band. At this point null balance has been restored at the detector hence no pulses exist in either channel and the motor shaft comes to rest.

The position of the attenuator comb 7 is a function of the sample absorption.

When the energy of the two beams balance no signal is produced by the detector.

If it is assumed that the transmission of each path is $T_1$ when the beams are balanced, that the transmission of the sample is $T_2$, that the transmission of the attenuator comb 7 changes by $T=$a constant for each pulse received irrespective of polarity or starting point and that a positive pulse increases the transmission whilst a negative pulse decreases the transmission, then if the number of positive pulses is "$p$," and "$q$" is the number of negative pulses to restore balance after the introduction of the sample.

$$(q-p)T \cdot T_1 = T_2 \cdot T_1$$

i.e.
$$(q-p)T = T_2$$

or
$$(q-p) \alpha T_2$$

The transmission of the sample is, therefore, proportional to the difference between the positive and negative pulses required to restore balance. By providing a pulse counter 18 it is possible to record the tranmission of the sample as a function of the difference between the positive and negative pulses between positions of balance.

The use of pulses makes possible the use of a multi-channel binary counter 19 the output of which feeds a paper tape punch 20 which provides a record in a form suitable for storage or for processing on a digital computer.

If desired the paper tape records may be automatically converted into a graphical record using an instrument recorder 18 for example. A further possibility is to use the pulsed supply to feed an additional pulse motor with a stepped output to actuate a remote pen recorder for recording the spectrum.

An additional pulsed supply may also be used to operate a drive for the wavelength selection device in the monochromator.

A still further possibility is the use of circuitry to record the pulse counts at successive wavelength steps to determine the area under a chosen part of the spectrum.

A still further possibility is the provision of a recorder 21 responsive to movements of the attenuator comb.

It will be seen, therefore, that the production of a pulsed supply greatly increases the flexibility of the spectrometer by its ability to produce spectra in different forms separately or simultaneously.

I claim:
1. A null balance double beam spectrometer having two beam paths for radiation one beam path being for the transmission of radiation through a sample substance and the other beam path being a reference beam path, a monochromator for receiving radiation from each beam path and selecting from the incident radiation a narrow wavelength region, detection means for receiving radiation from said monochromator and producing electrical pulses dependent on the energy content of each beam, a chopper acting to chop each beam at the same means receives radiation from each beam alternately and a movable attenuating member in one of the beam paths to adjust the radiation transmitted from said beam path to the monochromator, said attenuating member being operable in response to pulses from said detection means, said detection means comprising a detector receiving radiation from the beam paths and producing an alternating current output at the chopping frequency, means for amplifying the output from said detector and synchronously rectifying said output to produce a D.C. voltage the polarity of which is dependent on the relative intensity of radiation of the two beams falling on the detector, a frequency multiplying device connected to said amplifying means in which device said D.C. voltage is interrupted at a multiple of the frequency of chopping to produce a train of electrical pulses, a pulse separator unit connected to said frequency multiplying device in which unit positive and negative pulses are separated and negative pulses inverted, a stepping motor fed by said pulses from said pulse separator through a logic circuit and rotating by discrete angles in a forward or reverse direction depending on the polarity of the pulses, means coupling said stepping motor to the movable attenuating member, and recording means operable by said pulses to produce spectral data relating to a sample substance under test.

2. A null balance, double beam spectrometer having means defining two beam paths for radiation, one beam path being for transmission of radiation through a sample under test and the other beam path being a reference path, a monochromator for selecting from radiation incident upon it a succession of narrow wavelength regions within a selected wavelength scan and traversing said regions in turn across an exit slit, means for interrupting each beam path alternately, means for directing radiation from each beam path onto the monochromator, detection means for receiving radiation from the exit slit of the monochromator and to produce an electrical signal at the frequency of beam interruption and representative of the ratio of the energies in the two beam paths, the signal produced by the detection means when the energy content of the sample path exceeds that of the reference path being of opposite phase to the signal produced when the energy content of the sample path is less than that in the reference path, means for sensing the phase of the signal from the detection means and producing positive pulses of constant amplitude for signals of one phase and negative pulses of constant amplitude for signals of opposite phase, and means responsive to the said positive and negative pulses to modify the energy content of the reference beam so as to equalize the energy received by the detection means from each path and produce spectral data representing the variation of the ratio of energies in the two beam paths with wavelength or wave number.

3. A null balance double beam spectrometer as claimed in claim 2, in which spectrometer the means for producing spectral data comprise a stepping motor rotatable in one direction in response to positive pulses and in the reverse direction in response to negative pulses, and a beam attenuator driven by said stepping motor and movable into or out of the reference beam to balance the energy received by the detection means from each path.

4. A null balance double beam spectrometer as claimed in claim 2, in which spectrometer the means for producing spetcral data comprise a stepping motor rotatable in one direction in response to positive pulses and in the reverse direction in response to negative pulses, a beam attenuator driven by said stepping motor and movable into or out of the reference beam to balance the energy received from detection means from each beam path, and recording means for producing spectral data and responsive to movements of said attenuating member.

5. A null balance double beam spectrometer as claimed in claim 2, in which the means for producing spectral data comprise a recorder operable by said positive and negative pulses.

6. A null balance double beam spectrometer as claimed in claim 2, in which the means for producing spectral data comprise a multi-channel binary counter for counting the positive and negative pulses and feeding a tape punch to produce a tape which is available for analysis in a digital computer.

7. A null balance double beam spectrometer as claimed in claim 2, in which the means for producing spectra data comprise a pulse counter responsive to the positive and negative pulses to indicate digitally the transmission or absorption of a sample substance under investigation by the spectrometer.

8. A null balance double beam spectrometer as claimed in claim 2, in which the means for producing spectral data comprise pulse counting means for adding the pulse counts at successive wavelength steps.

References Cited
UNITED STATES PATENTS 2,900,866   8/1954   Coates et al.

RONALD L. WIBERT, Primary Examiner

V. P. McGRAW, Assistant Examiner

U.S. Cl. X.R.

356—93, 97